(12) United States Patent
Sindel et al.

(10) Patent No.: US 12,480,592 B2
(45) Date of Patent: Nov. 25, 2025

(54) APPARATUS FOR SEALINGLY CONNECTING TO AN OPENING OF A CARRIER COMPONENT

(71) Applicant: Illinois Tool Works Inc., Glenview, IL (US)

(72) Inventors: Melanie Sindel, Nuremberg (DE); Jan Müller, Würzburg (DE); Manuel Kellner, Alsfeld (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/368,186

(22) Filed: Sep. 14, 2023

(65) Prior Publication Data

US 2024/0093799 A1 Mar. 21, 2024

(30) Foreign Application Priority Data

Sep. 15, 2022 (DE) .................. 10 2022 123 641.4
Aug. 30, 2023 (DE) .................. 10 2023 123 330.0

(51) Int. Cl.
| | |
|---|---|
| *F16K 27/02* | (2006.01) |
| *F16J 15/10* | (2006.01) |
| *F16K 27/12* | (2006.01) |
| *H05K 5/06* | (2006.01) |
| *H01M 50/342* | (2021.01) |

(52) U.S. Cl.
CPC ......... *F16K 27/0236* (2013.01); *F16J 15/104* (2013.01); *F16K 27/12* (2013.01); *H05K 5/061* (2013.01); *H01M 50/3425* (2021.01)

(58) Field of Classification Search
USPC .......... 251/351; 277/353; 137/68.19, 21, 23, 137/28, 859
See application file for complete search history.

(56) References Cited

U.S. PATENT DOCUMENTS

| | | | | |
|---|---|---|---|---|
| 4,328,290 | A * | 5/1982 | Szymborski | H01M 50/308 429/89 |
| 4,400,450 | A * | 8/1983 | Wagner | H01M 10/16 429/89 |
| 6,202,901 | B1 * | 3/2001 | Gerber | B65D 47/2081 137/859 |
| 6,237,621 | B1 * | 5/2001 | Chaffee | F16K 15/202 137/232 |
| 7,302,962 | B2 * | 12/2007 | Blake, III | B60H 1/249 137/859 |
| 7,490,623 | B2 * | 2/2009 | Rypstra | B65D 77/225 137/859 |
| 8,074,685 | B2 * | 12/2011 | Calvo | B65D 33/2508 206/524.8 |

(Continued)

*Primary Examiner* — Matthew W Jellett
(74) *Attorney, Agent, or Firm* — McAndrews, Held & Malloy, Ltd.

(57) ABSTRACT

Disclosed is an apparatus, in particular a valve apparatus, for sealingly connecting to an opening of a carrier component. The apparatus includes a base body made of a hard component for the connection to an edge of a carrier component delimiting an opening, and a sealing device made of a soft component. The base body comprises at least one connection passageway configured as an undercut for the form-fit connection to a correspondingly configured element of the soft component, and a lid element for covering the connecting region.

15 Claims, 6 Drawing Sheets

(56) References Cited

U.S. PATENT DOCUMENTS

| | | | | |
|---|---|---|---|---|
| 8,485,398 B2* | 7/2013 | Kneer | ............... | B65D 47/2075 |
| | | | | 137/859 |
| 10,287,066 B2* | 5/2019 | Hatton | ............... | B65D 47/2031 |
| 11,117,710 B2* | 9/2021 | Georgelos | .......... | B65D 75/5877 |
| 11,267,634 B2* | 3/2022 | Angay | ................. | B65D 77/225 |
| 11,912,472 B2* | 2/2024 | Pater | ................. | B65D 47/2031 |
| 2023/0235829 A1* | 7/2023 | Bommineni | ...... | H01M 50/3425 |
| | | | | 137/68.19 |
| 2023/0323973 A1* | 10/2023 | Pfeiffer | ................ | F16K 17/363 |
| 2024/0047815 A1* | 2/2024 | Rink | ................ | H01M 50/3425 |
| 2024/0318721 A1* | 9/2024 | Rink | ..................... | F16J 15/021 |

* cited by examiner

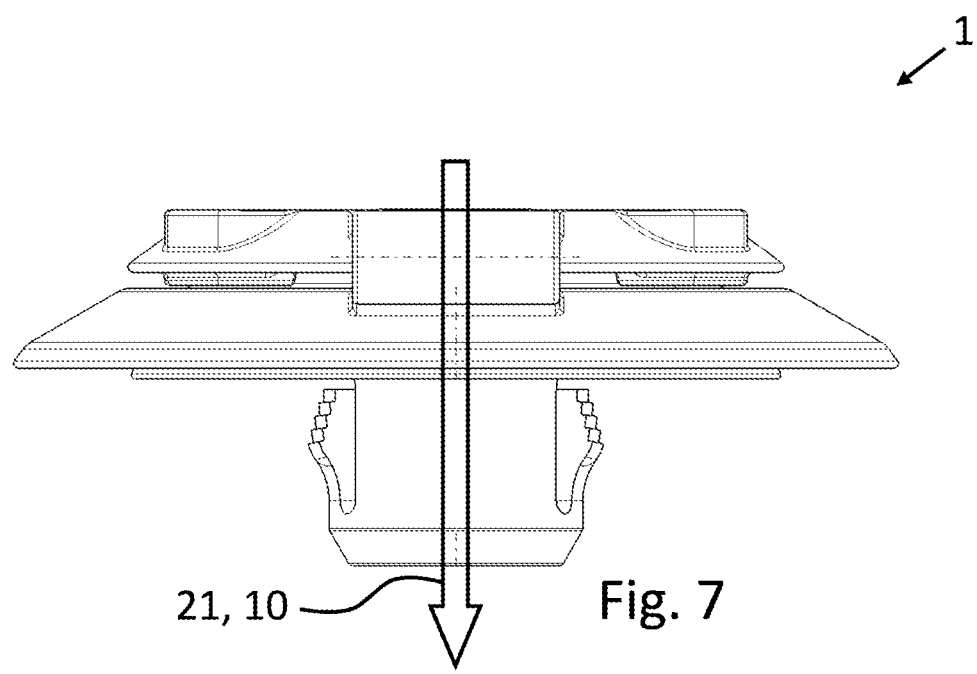
21, 10   Fig. 7
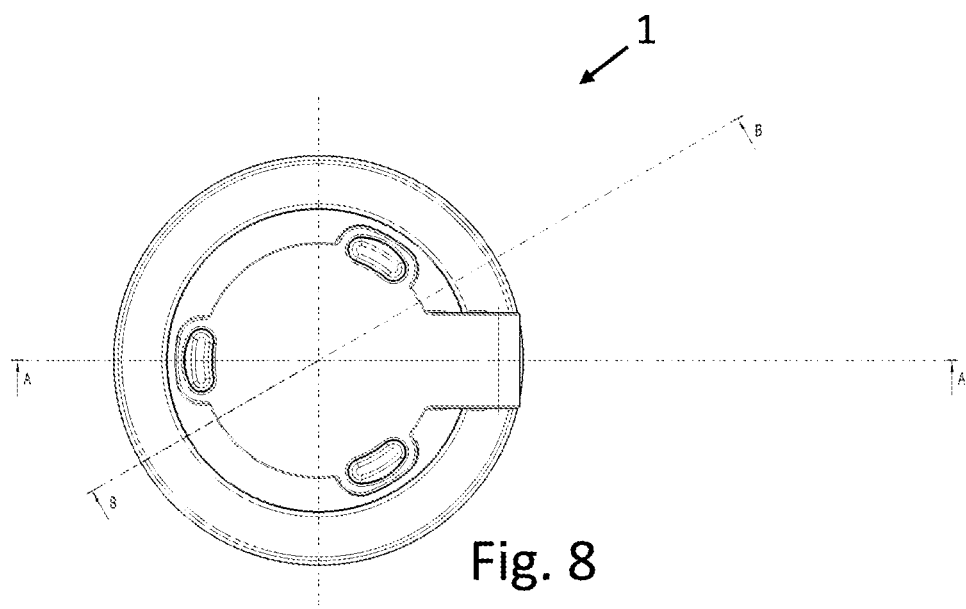
Fig. 8

APPARATUS FOR SEALINGLY CONNECTING TO AN OPENING OF A CARRIER COMPONENT

RELATED APPLICATIONS

The present application claims the benefit of German Patent Application Nos. DE 10 2022 123 641.1, filed Sep. 15, 2022, and DE 10 2023 123 330.0, filed Aug. 30, 2023, each titled "Apparatus for Sealingly Connecting to an Opening of a Carrier Component," the contents of which are hereby incorporated by reference.

BACKGROUND

Electrical equipment subjected to external influences must be protected against these influences such that they do not suffer any damage. The scope and type of protection will depend on the final location of use of the equipment.

A need exists for a system, apparatus, and method for, inter alia, sealingly connecting to an opening of a carrier component.

SUMMARY

The present disclosure relates to an apparatus, substantially as illustrated by and described in connection with at least one of the figures, as set forth more completely in the claims. In particular a valve apparatus, for sealingly connecting to an opening of a carrier component, in particular a valve apparatus.

The problem addressed by the present disclosure is to provide an apparatus for sealingly connecting to an opening of a carrier component, in particular a valve apparatus, which withstands the specifications of an IPX9 test, in particular an IPX9K test. A further problem addressed by the present disclosure is to provide an apparatus for sealingly connecting to an opening of a carrier components, which offers an alternative to the apparatus known from the prior art. In addition, a problem addressed by the present disclosure is to provide an apparatus for sealingly connecting to an opening of a carrier component that is safe and reliable to operate with respect to a pressure washer test.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 7 illustrates a further schematic side view of the valve apparatus according to the disclosure in the closed state.

FIG. 8 illustrates a plan view of the valve apparatus according to the disclosure in the closed state.

DETAILED DESCRIPTION

Figure 1:
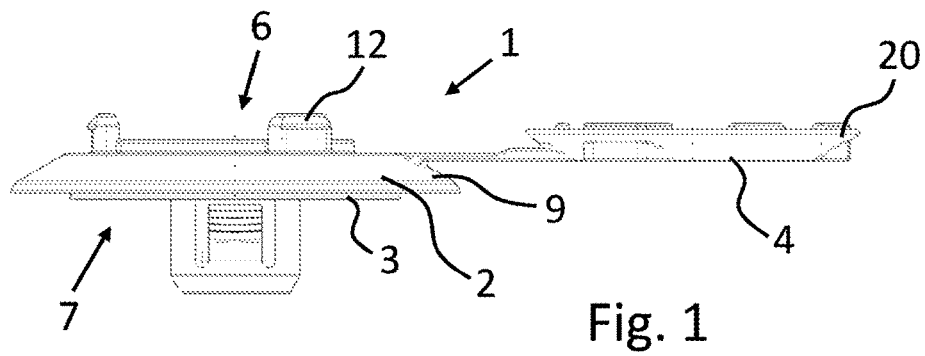
FIG. 1 illustrates a schematic side view of a valve apparatus according to the disclosure.

Various specific embodiments of the present disclosure will be described below with reference to the accompanying drawings which constitute part of the present disclosure, but the embodiment would not limit the scope of the present disclosure. It should be understood that although the terms such as "front", "rear", "upper", "lower", "left", "right" and so on indicating directions are used in the present disclosure to describe orientations of various illustrative structural parts and elements in the present disclosure, the terms used herein are merely used for ease of description and are determined based on the illustrative orientation shown in the accompanying drawings. Since the embodiments disclosed in the present disclosure can be arranged in different orientations, the terms indicating directions are merely illustrative and should not be considered as limitations. In addition, the terms "first", "second", etc. used in the present disclosure are merely used to distinguish different objects, instead of indicating that there is any particular sequential relationship between these objects. The term "comprise/include" and derivatives thereof mean inclusion without limitation. Unless otherwise specified and limited, the terms "mounting", "connecting" and "connection" should be understood broadly. For example, they may be mechanical or electrical connection, internal communication between two elements, or direct connection or indirect connection via an intermediate medium. For those of ordinary skills in the art, the specific meanings of the above terms can be understood according to specific cases. If possible, the same or similar reference numerals used in the present disclosure refer to the same components.

An IPX9K test (pressure washer test) is a test for demonstrating the resistance of components (usually electric vehicles (EV)) against the impact of water. A nozzle sprays onto the specimen at a distance of 100-150 mm and at four different angles (0°, 30°, 60°, 90°), with a water pressure of 100 bar and a water temperature of 80° C. The nozzle sprays at each angle for 30 seconds. Altogether, the test lasts 120 seconds.

IPX9 and IPX9K are thus conducted at high water pressures and high water temperatures. This simulates, for example, the protection of a housing against the formation of a powerful water surge when driving through a puddle (IPX4K/IPX6K) or the cleaning of a vehicle by steam jet cleaning (IPX9/IPX9K). These tests were originally developed in the automotive industry but can be transferred to many day-to-day applications.

The IPX9 rating is tested in accordance with EN 60529 and is valid for electrical equipment, while IPX9K is tested in accordance with ISO 20653 and relates to electrical equipment mounted on road vehicles.

A test according to IPX9 requires that the FORCE of a water jet is measured during the water test, while an IPX9K test requires that the PRESSURE of the water jet is measured during the water test. In addition, the distance of the water jet nozzle for the IPX9 water test (200 mm) can be further distanced up to 50 mm compared to the IPX9K water test (maximum 150 mm).

According to the disclosure, an apparatus, in particular a valve apparatus, for sealingly connecting to an opening of a carrier component, having a connecting or sealing side and a covering side, is provided, wherein the apparatus is configured as a 2-component unit. In some examples, the apparatus comprises an annular base body made of a hard component for the valve-side connection to an edge of a carrier component delimiting an opening, and a sealing device made of a soft component with a sealing element for sealing on the connecting side against a carrier component with at least one sealing lip, wherein, on the covering side or on a side facing away from the carrier component, the base body comprises at least one connection passageway configured in the manner of an undercut for the form-fit connection to a correspondingly configured element of the soft component, and a lid element formed by a hard component, wherein the lid element is configured so as to cover a connecting region between the undercut-like connection passageway of the hard component and the soft component of the sealing device.

The valve apparatus according to the disclosure is configured as a 2-component unit consisting of at least one soft component and at least one hard component. The soft component forms a sealing device for sealing against a carrier component.

This means that the valve apparatus according to the disclosure does not have separate or additional sealing devices or seal elements, for example O-rings or the like, but rather only the sealing device made of a soft component is provided, which is connected at least in a form-fit manner to the base body. Furthermore, the valve apparatus according to the present disclosure can comprise any suitable closure body, for example a membrane or otherwise configured closure elements, in order to form a desired valve apparatus.

In a so-called pressure washer test (IPX9K test) for demonstrating resistance of components, mostly for electric vehicles, against the impact of water with a high temperature (80° C.) and high pressure (100 bar), there is a risk that form-fit connections between a soft component and a hard component may be damaged or even destroyed by the high-pressure jet, as a result of which a sealing effect in this region is no longer ensured.

The inventors of the present disclosure have found that an angle of the water jet of 0°, 30°, 60°, and 90° is critical for regions of 2-component units having a soft component integrally formed on a hard component. The water jet has enough force to push the soft component out of its position. The result is a leaky component.

In the apparatus according to the disclosure, by contrast, such connection passageways of the base body configured in a rear-cut manner are covered by means of the lid element for the form-fit connection to correspondingly configured elements of the soft component. In this way, the form-fit connection of the sealing device to the base body is securely and reliably protected against damage by the pressure washer jet, because the lid element covers the at-risk regions.

The base body can have a connecting side and a covering side, wherein the connection passageway is approximately circular cylindrical in the region of the connecting side and has a larger cross section than in the region of the covering side, in which the connection passageway is also circular cylindrical and has a smaller diameter. In this way, due to the undercut-like design of the connection passageway, a form-fit connection is provided between the sealing device and the base body.

The valve apparatus can be inserted into a carrier component in an assembly direction and connected thereto, wherein the lid element is arranged spaced apart from the base body in the assembly direction, and wherein, in the region of the connection passageway, the lid element extends approximately parallel to the connection passageway and thus orthogonal to the assembly direction or radially outward with a covering portion at least up to a radially outer edge of the connection passageway or beyond, and/or wherein the covering portion of the lid element can be cap-shaped and extends across the connection passageway and a radially circumferential sheath wall of the base body in order to cover the at least one sealing lip towards the connecting side, and in particular also covers the sealing lip in a radially outward direction such that the lid element is configured such that the valve apparatus passes a pressure washer test (IPX9K test).

Thus, according to the present disclosure, two different aspects are provided for forming the lid element.

According to a first aspect, the covering portion, in particular a first covering portion, of the lid element extends only orthogonally to the assembly direction, and thus parallel to a surface of the base body in which the connection passageway is configured, in a radial direction outward to at least an outer radial edge region of the connection passageway or beyond.

In this way, the form-fit connection between the soft component and the hard component in the connection passageway is sufficiently protected in order to withstand a corresponding pressure washer test at an angle of 0 0, 30°, 60°, and 90° relative to the assembly direction.

According to a second alternative aspect, the portion of the lid element is cap-shaped and extends over the connection passage, similar to the first aspect, in particular with a first covering portion, and also over a radially circumferential sheath wall of the base body, in particular with a second covering portion, such that the at least one sealing lip of the sealing device for sealing the valve apparatus against the carrier component is also covered.

According to the second aspect, the lid element is preferably designed as a separate component.

According to the second aspect, a screen-like covering of the sealing lip of the sealing device by means of a covering element of the base body is then made obsolete. Only the lid element spaced apart from the base body is sufficient in order to also allow the sealing lip of the sealing device to pass a pressure washer test.

Thus, the lid element can comprise the first covering portion extending orthogonally to the assembly direction, and the base body comprises a screen-like covering element for covering the sealing lip and preferably for contacting the carrier component, such that, in a final assembly state, the sealing lip is nearly completely covered by the covering element of the base body and a carrier component (first example), and/or the lid element can comprise the first and the second covering portion inclined radially outward in the assembly direction and/or counter to the assembly direction, such that the lid element comprises a screen-like covering element for covering the connection passageway and the sealing lip and preferably for arranging at a small distance to or contacting the carrier component by means of the first and the second covering portion, such that, in a final assembly state, the connection passageway and the sealing lip are nearly completely covered by the covering element of the base body and a carrier component.

Preferably, the sealing device can comprise at least one sealing lip arranged radially circumferentially around the base body, wherein the base body comprises a screen-like covering element for covering the sealing lip and preferably for contacting the carrier component, such that the sealing lip is almost completely covered/shielded and protected by the covering element of the base body and a carrier component in a final assembly state or final assembly position.

By providing the screen-like covering element, which is preferably arranged slightly spaced apart from the carrier component, or by contacting the carrier component and completely covering at least one or preferably two sealing lips of the sealing device, this region of the apparatus can also pass the so-called pressure washer test and resist the pressure of the water jet.

In apparatuses known from the prior art, whose connection passageways and/or sealing lips are not covered and protected, it can occur that the jet of the pressure washer lifts the sealing lips off of the carrier component and, in this way, water can penetrate into the apparatus.

This is securely and reliably prevented with the screen-like covering element or the second covering portion according to the disclosure, which prevents the lifting of the sealing lip by shielding the sealing lip.

The screen-like covering element of the base body and/or the second covering element of the lid element can preferably be circularly annular and can be inclined at an acute angle, in particular <60° or <45° or <30°, relative to an axial direction.

The base body can be circularly annular and can limit a passageway that is coverable by means of the lid element, wherein the lid element is preferably connected to the base body by means of a catching device (clip connections).

Alternatively, the lid element can also be connected to the base body by means of a screw or adhesive or weld connection. In particular, the lid element can be integrally connected to the base body via a hinge, preferably a film hinge or can be designed as a separate component.

By the respective connecting means, the lid element can be securely and reliably connected to the base body, such that the connection passageway and correspondingly configured elements of the soft component are protected and covered during a pressure washer test.

The sealing device can also be materially or chemically bonded to the base body in addition to the form-fit connection.

Also in the case of such a material or chemical bonding, the connection passageways and the correspondingly configured elements of the soft component are securely and reliably protected against damage by the lid element and the sealing lips, if present, by the screen-like covering element during the pressure washer test, if present.

Preferably, the base body and the sealing device are produced and connected to one another by means of an injection molding method, in particular by means of a 2-component injection molding method. The base body can comprise catching means for connecting to a carrier component. The apparatus can preferably be configured as a valve apparatus having a membrane.

The membrane can be attached to a radially circumferential assembly web adjacent to the passageway, wherein the assembly web is surrounded radially outwardly, in particular concentrically, by a protective web, which has a height counter to the assembly direction corresponding to the assembly web or higher in order to protect the connection between the membrane and the assembly web against damage during a leak test.

Alternatively, the apparatus can also be configured as a valve apparatus having a poppet valve, a pipe valve, a plunger valve, a rolling diaphragm valve, a pinch valve, a needle valve, or a ball valve.

An aspect of the apparatus as a closure element or as any other apparatus that can be connected to an opening of a carrier component is also contemplated.

A valve apparatus according to disclosure will be described in further detail below on the basis of two exemplary aspects shown in the figures.

Some of the additional aspects and advantages of the present disclosure will be set forth in the following description, and some will become apparent from the following description, or be learned by practice of the present disclosure.

An apparatus 1 according to the disclosure for sealingly connecting to an opening of a carrier component (not shown) is explained below by way of example using a valve apparatus, in particular a valve apparatus with a membrane 19 (FIGS. 1 to 10).

Figure 2:
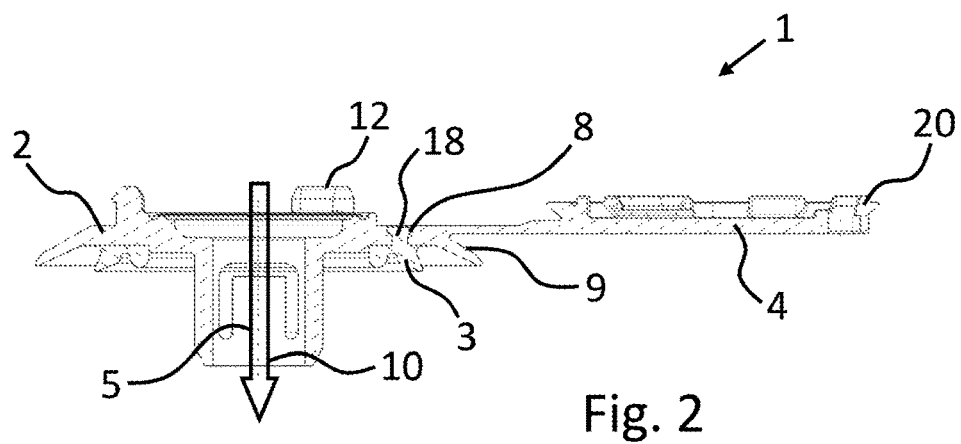
FIG. 2 illustrates the illustration from FIG. 1 in a side-cut view.
Figure 3:
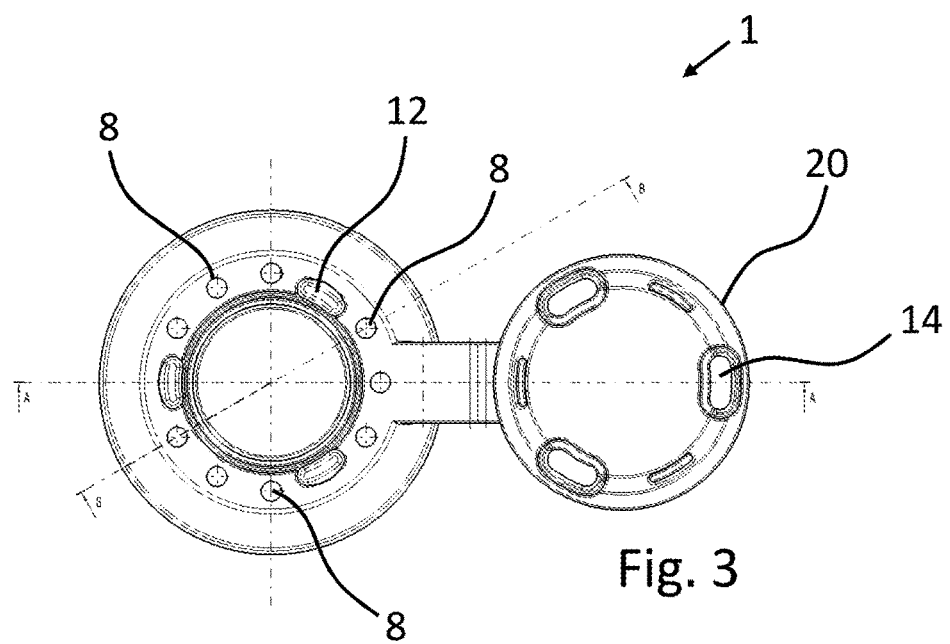
FIG. 3 illustrates a plan view of the valve apparatus according to the disclosure.
Figure 4:
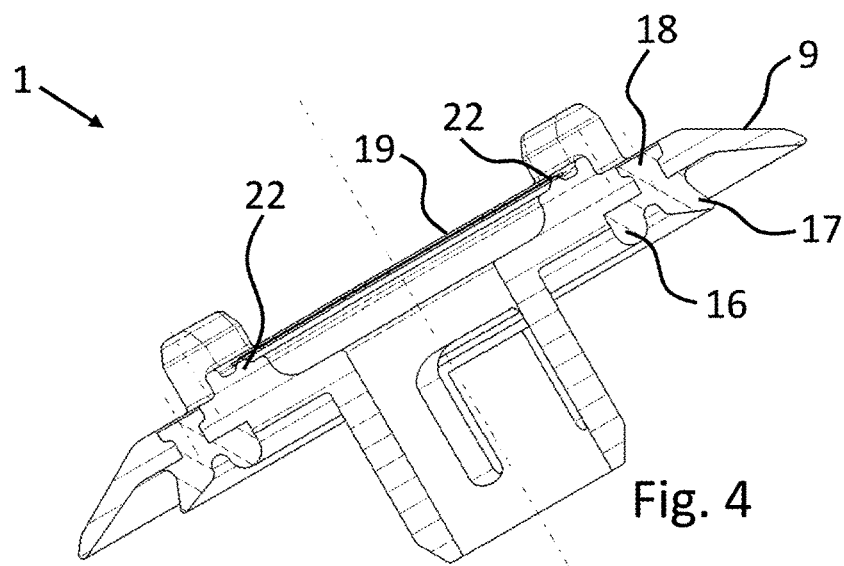
FIG. 4 illustrates the illustration from FIG. 3 cut along the line B-B.
Figure 5:
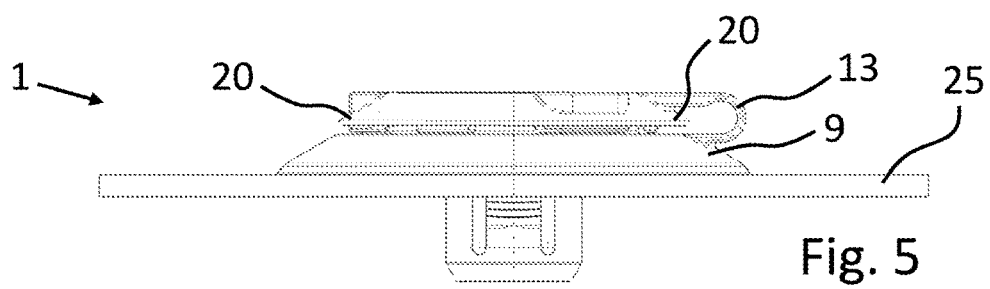
FIG. 5 illustrates the illustration from FIG. 3 cut along the line A-A.
Figure 6:
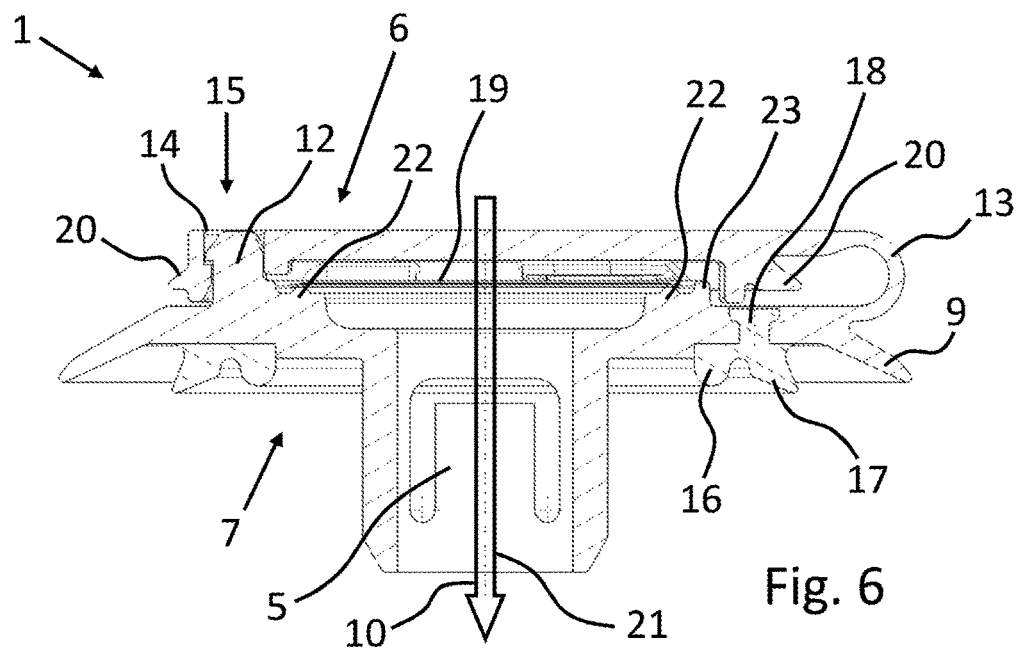
FIG. 6 illustrates a schematic side view of the valve apparatus according to the disclosure in the closed state.
Figure 9:
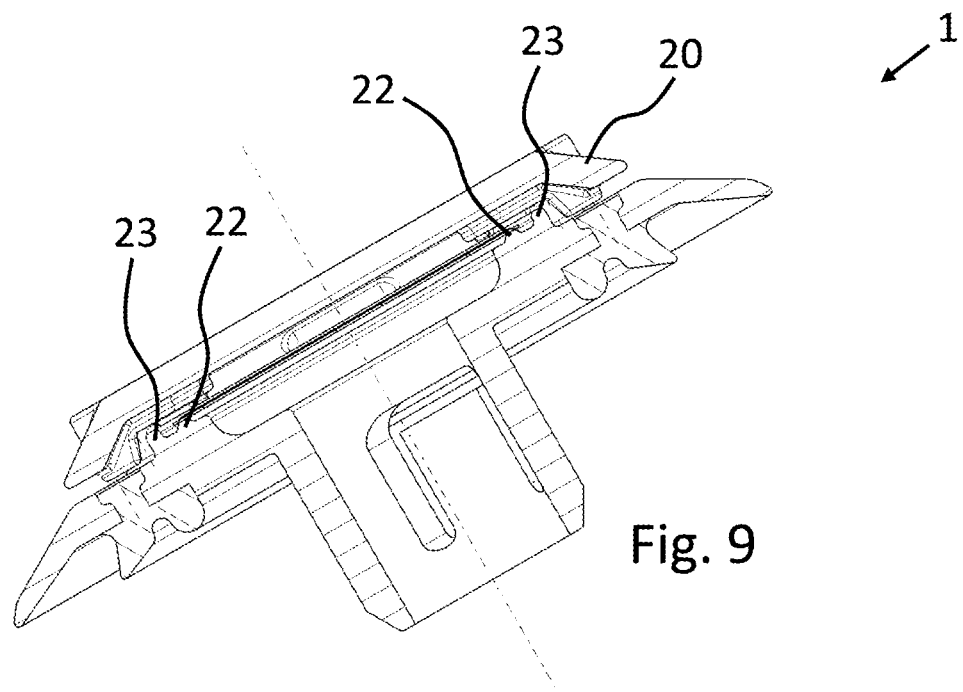
FIG. 9 illustrates the illustration from FIG. 8 cut along the line A-A.
Figure 10:
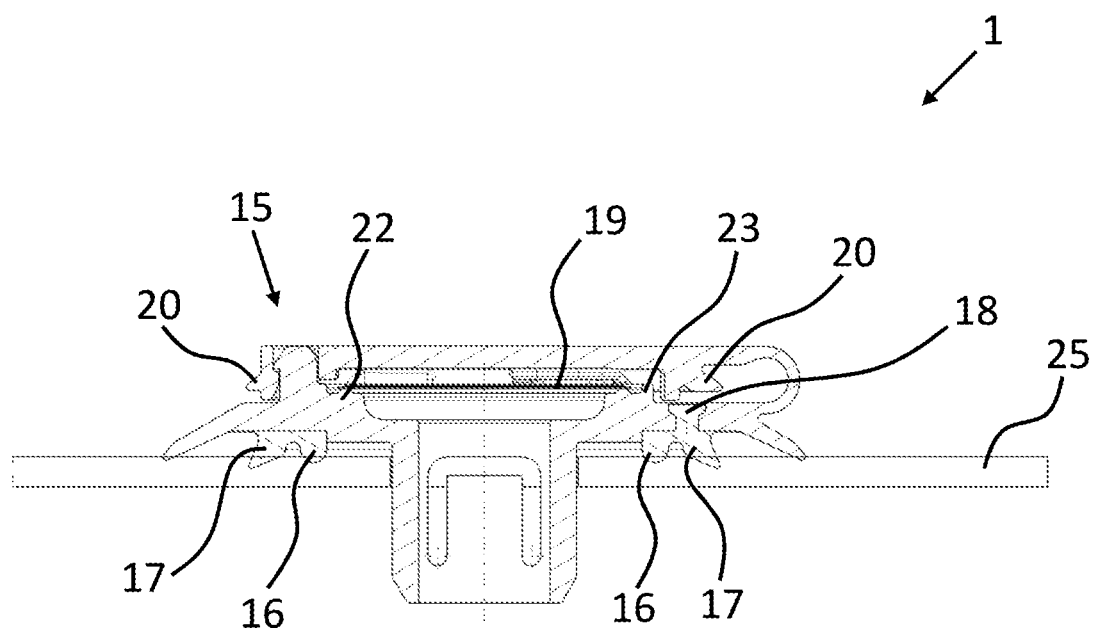
FIG. 10 illustrates the illustration from FIG. 8 cut along the line B-B in a condition mounted in a component.

FIG. 1 illustrates a schematic side view of a valve apparatus 1 according to the disclosure, while FIG. 2 illustrates a side-cut view thereof and FIG. 3 illustrates a plan view thereof. FIG. 4 illustrates the illustration from FIG. 3 cut along the line B-B, while FIG. 5 illustrates the illustration from FIG. 3 cut along the line A-A. FIGS. 6 and 7 illustrate schematic side views of the valve apparatus 1 in the closed state, while FIG. 8 illustrates a plan view of the valve apparatus 1 in the closed state. FIGS. 9 and 10 illustrate the illustration from FIG. 8 cut along the line A-A and line B-B, respectively, in a condition mounted in a component.

Figure 11:
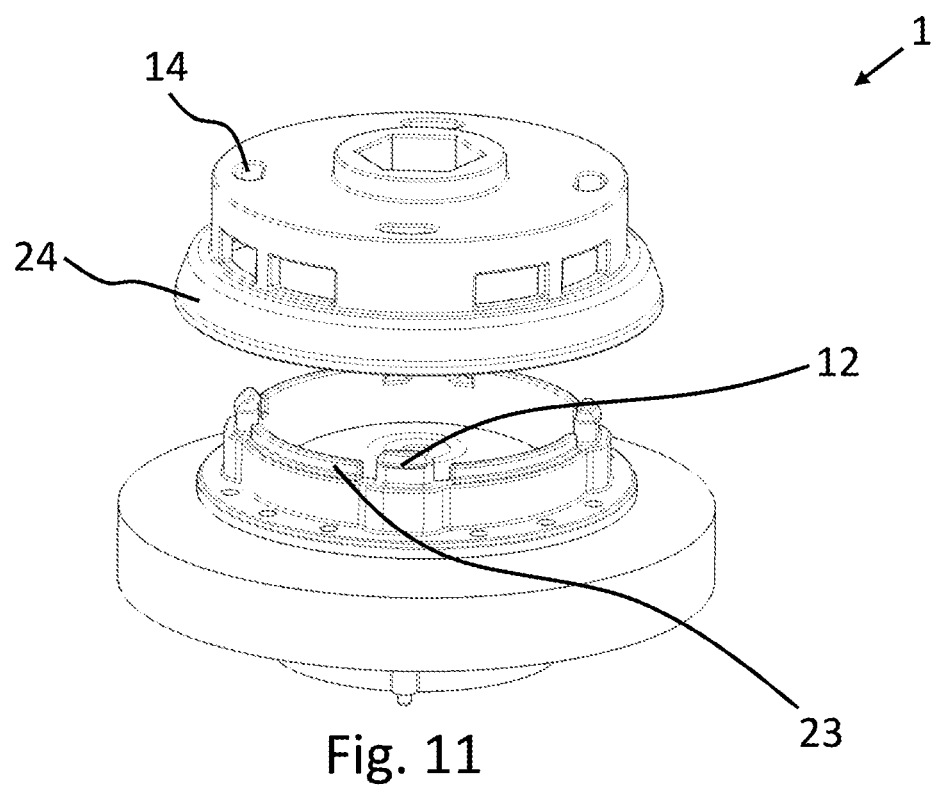
FIG. 11 illustrates a schematic perspective view of the valve apparatus according to the disclosure according to a second example.
Figure 12:
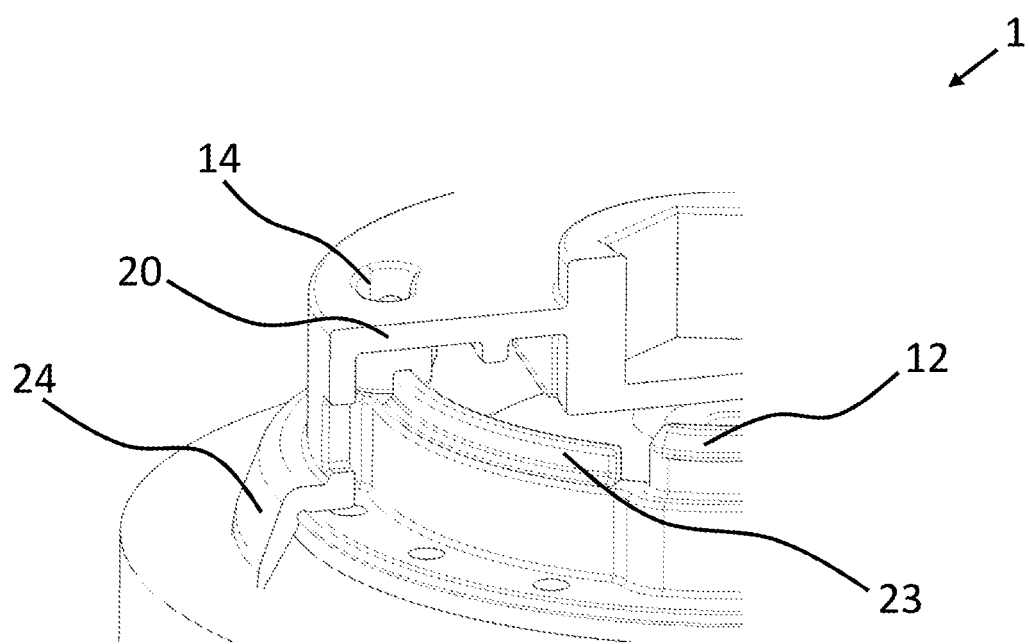
FIG. 12 illustrates a schematic perspective and partially cut detail view of the valve apparatus according to the disclosure according to the second example.
Figure 13:
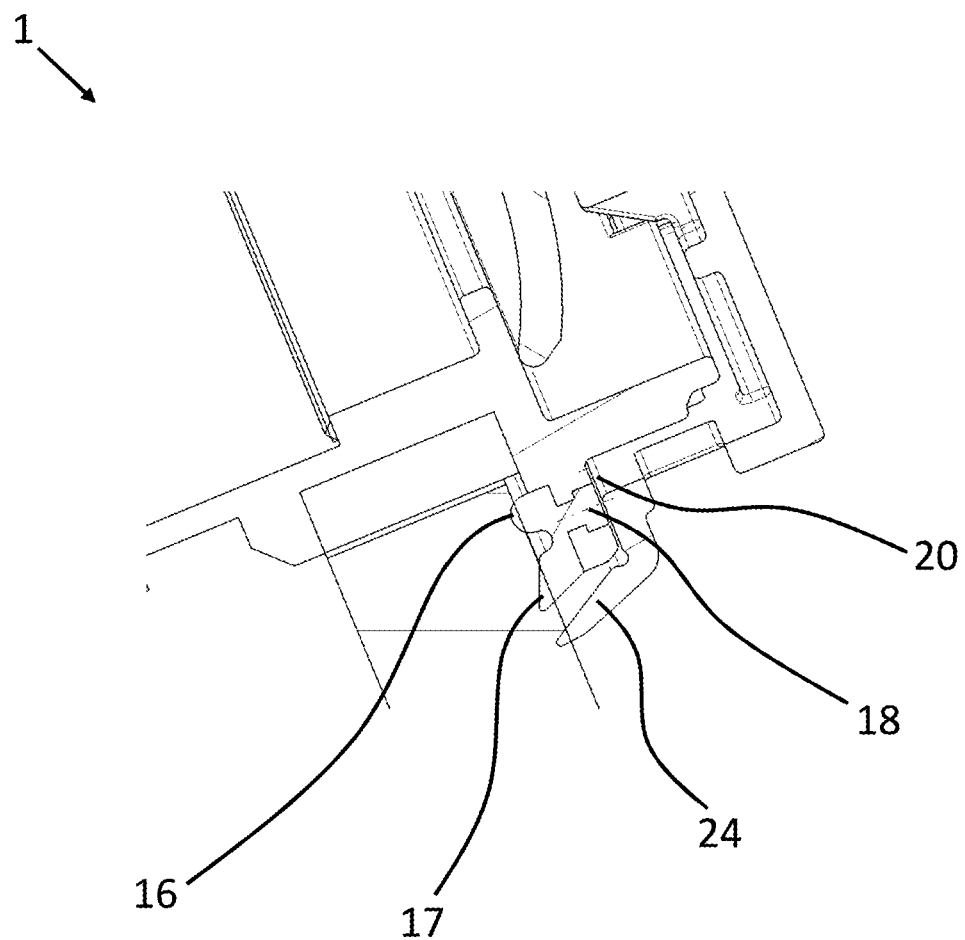
FIG. 13 illustrates a further schematic side-cut detail view of the valve apparatus according to the disclosure according to the second example.

FIG. 11 illustrates a schematic perspective view of the valve apparatus 1 according to the disclosure according to a second example. FIG. 12 illustrates a schematic perspective and partially cut detail view of the valve apparatus 1 according to the disclosure according to the second example. FIG. 13 illustrates a further schematic side-cut detail views of the valve apparatus 1 according to the disclosure according to the second example.

The apparatus 1 comprises a base body 2, a sealing device 3, and a lid element 4. The base body 2 is approximately circularly annular and delimits a passageway 5. The base body 2 further comprises a covering side 6 and a connecting side 7 facing a carrier component. In the base body 2, nine connection passageways 8 are configured radially circumferentially and approximately equidistant from one another around the passageway 5.

The connection passageways 8 are configured circular cylindrically in the region of the covering side 8 and also circular cylindrically in the region of the connecting side 7, wherein the connection passageways 8 have a larger diameter in the region of the covering side 6 than in the region of the connecting side 7.

The base body 2 further comprises a screen-like covering element 9 extending radially circumferentially from the covering side 6 towards the connecting side 7.

The covering element 9 is inclined by an angle of approximately 30° relative to an axial direction 10 that extends parallel to a passage direction of the apparatus 1.

The covering element 9 extends in the direction of the carrier component such that, in a final assembly position, it contacts the carrier component or is arranged slightly spaced apart therefrom.

In addition, three radially circumferential and equidistantly arranged catching elements 12 are configured on the covering side 8 of the base body 2 for the spaced connection to the lid element 4.

The lid element 4 is integrally connected to the base body 2 via a hinge, in particular a film hinge 13, and, in the region of the catching elements 12, comprises correspondingly configured catching recesses 14, such that the catching elements 12 form a catching device 15 in conjunction with the catching recesses 14.

The sealing device 3 is approximately circularly annular and comprises two sealing lips 16, 17 extending in the direction of the carrier component, i.e., a first sealing lip 16 and a second sealing lip 17 extending away from the covering side 8 in approximately the axial direction 10.

The two sealing lips 16, 17 also comprise elements 18 extending in the direction of the covering side 6, which are configured so as to correspond to the connection passageways 8 and are received therein in an undercut manner.

The elements 18 accordingly have a circular cylindrical cross-section in the region of the connecting side 7 and also have a circular cylindrical cross-section in the region of the covering side 8 with a larger diameter than in the region of the connecting side.

The base body 2 is made from a hard component.

The sealing device 3 is made from a soft component.

The apparatus 1 according to the disclosure is produced by means of a 2-component injection molding method, wherein the sealing device 3 is chemically or materially bonded to the base body and, in the region of the connection passageways 8, additionally connected in a form-fit or undercut manner via the elements 18.

The lid element 4 comprises a tangentially circumferential first covering portion 20 on its radial outer edge.

The apparatus 1, in particular a valve apparatus 1, can be inserted into a carrier component (not shown) in an assembly direction 21.

The first covering portion 20 extends approximately parallel to a surface of the base body 2 in the region of the connection passageway 8 and thus orthogonally to the assembly direction 21 or outwardly in the radial direction.

Furthermore, the first covering portion 20 extends at least up to a radially outer edge of the connection passageway 8 and, in the present first example, also extends beyond this.

Thus, according to the first example, the lid element 4 comprises the first covering portion extending orthogonally to the assembly direction 21 for completely covering the connection passageways 8, and the base body 2 comprises the screen-like covering element 9 for covering the sealing lips 16, 17 and preferably for contacting a carrier component, such that, in a final assembly position, the sealing lips 16, 17 are almost completely covered by the covering element 9 of the base body.

The membrane 19 is integrally formed onto or attached to a radially circumferential assembly web 22 adjacent to the passageway 5. In a radially outward direction, the assembly web 22 is surrounded by a radially or tangentially circumferential protective web 23, which has a height counter the assembly direction 21 corresponding to the assembly web 22, or in particular higher, in order to protect the connection between the membrane 19 and the assembly web 22 against damage during a leak test.

In the following, a valve apparatus 1 according to the disclosure is described in further detail according to a second example (FIGS. 11 and 12). Unless otherwise described, the valve apparatus 1 according to the second example of the disclosure has the same features as the valve apparatus 1 according to the first example. Identical technical features bear the same reference numerals.

According to the second example, an opening and closing closure element is provided in place of the membrane. The valve apparatus 1 according to the second example differs from the first example of the valve apparatus 1 in that no covering element 9 is integrally formed on the base body 2 and in that the lid element 4 comprises the first covering portion 20 for covering the connection passageway 8 and a second covering portion 24 for covering the sealing lips 16, 17.

According to the second example, the lid element 4 is thus configured in a cap-like manner and comprises the first covering portion 20, which is configured approximately analogously to the first example, and the second covering portion 24, wherein the first covering portion 20 extends over the connection passageways 8 and the second covering portion 24 over a radially circumferential sheath wall of the base body 2 in order to cover the sealing lips 16, 17 towards the connecting side 7, such that the lid element 4 is configured such that the valve apparatus passes a pressure washer test (IPX9K test).

According to the second example, it is thus provided that the lid element 4 comprises a screen-like covering device comprising the first and the second covering elements 20, 24 for covering the connection passageways 8 and the sealing lips 16, 17, such that, in the final assembly position 21, the connection passageways 8 and the sealing lips 16, 17 are completely covered by the first covering portion 20 and the second covering portion 24.

What is claimed is:

1. A valve apparatus for sealingly connecting to an opening of a carrier component having a connecting side and a covering side, wherein the valve apparatus is configured as a 2-component unit, comprising:
   an annular base body made of a hard component for a valve-side connection to an edge of the carrier component delimiting an opening;
   a sealing device made of a soft component with a sealing element for sealing on the connecting side against the carrier component with at least one sealing lip, wherein, on the covering side, the annular base body comprises at least one connection passageway configured as an undercut for a form-fit connection to a correspondingly configured element of the soft component; and
   a lid element formed by the hard component, wherein the lid element is configured so as to cover at least one connecting region between the at least one connection passageway of the hard component and the soft component of the sealing device,
   wherein the at least one connection passageway extends through the annular base body from the connecting side and to the covering side of the annular base body.

2. The valve apparatus according to claim 1, wherein the valve apparatus can be inserted into the carrier component in an assembly direction and connected thereto, wherein the lid element is arranged spaced apart from the annular base body in the assembly direction, and wherein, in a region of the at least one connection passageway, the lid element extends approximately parallel to a surface of the annular base body and thus orthogonal to the assembly direction with a covering portion at least up to a radially outer edge of the at least one connection passageway or beyond; or wherein the lid element is cap-shaped and extends across the at least one connection passageway and a radially circumferential sheath wall of the annular base body for covering the at least one sealing lip towards the connecting side, such that the lid element is configured such that the valve apparatus passes an IP X9K pressure washer test.

3. The valve apparatus according to claim 2, wherein the lid element comprises a first covering portion extending orthogonally to the assembly direction, and the annular base body comprises a covering element for covering the sealing lip, such that, in a final assembly position, the sealing lip is nearly completely covered by the covering element of the annular base body; or wherein the lid element comprises the first and a second covering portion inclined radially outward in the assembly direction or counter to the assembly direction, such that a covering element is configured so as to cover the at least one connection passageway and the sealing lip to contact the carrier component by means of the first and the second covering portion, such that, in a final assembly position, the at least one connection passageway and the sealing lip are nearly completely covered by the covering element of the annular base body and a carrier component.

4. The valve apparatus according to claim 3, wherein the covering element or the second covering portion of the lid element of the annular base body is inclined at an acute angle relative to an axial direction.

5. The valve apparatus according to claim 3, wherein the annular base body is circularly annular and delimits a passageway that can be covered by means of the lid element, wherein the covering element is connected to, while being spaced apart from, the annular base body by means of a catching device and by means of a hinge.

6. The valve apparatus according to claim 1, wherein the sealing device is materially or chemically bonded to the annular base body in addition to the form-fit connection.

7. The valve apparatus according to claim 1, wherein the annular base body and the sealing device are produced by means of a 2-component injection molding method.

8. The valve apparatus according to claim 1, wherein the at least one connection passage way comprises a plurality of connection passageways configured as an undercut are formed on the base body radially circumferentially and approximately equidistant from one another in order to establish a form-fit connection with correspondingly configured elements of the soft component.

9. The valve apparatus according to claim 1, wherein the valve apparatus is a diaphragm valve having a membrane, wherein the membrane is arranged so as to cover a passage recess and is connected to the annular base body.

10. The valve apparatus according to claim 9, wherein the membrane is attached to a radially circumferential assembly web adjacent to the passageway, wherein the assembly web is surrounded radially outwardly by a protective web, which has a height counter to an assembly direction corresponding to the assembly web or higher in order to protect a connection between the membrane and the assembly web against damage during a leak test.

11. The valve apparatus according to claim 5, wherein the hinge is a film hinge.

12. The valve apparatus according to claim 4, wherein the acute angle is less than 60°.

13. The valve apparatus according to claim 4, wherein the acute angle is less than 45°.

14. The valve apparatus according to claim 4, wherein the acute angle is less than 30°.

15. The valve apparatus according to claim 3, wherein the screen like covering element contacts the carrier component.

* * * * *